Jan. 29, 1963 W. S. MAYES 3,075,817
REINFORCED LIGHT WEIGHT PISTON
Filed Feb. 28, 1961
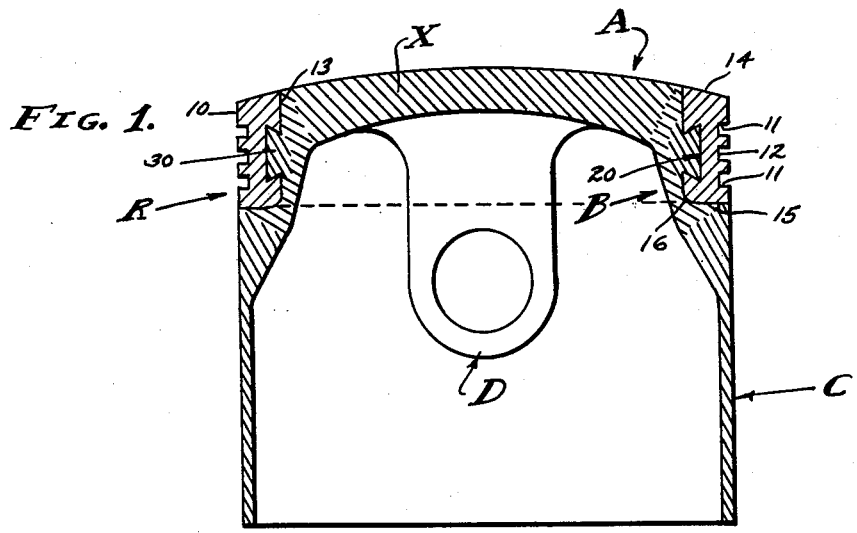
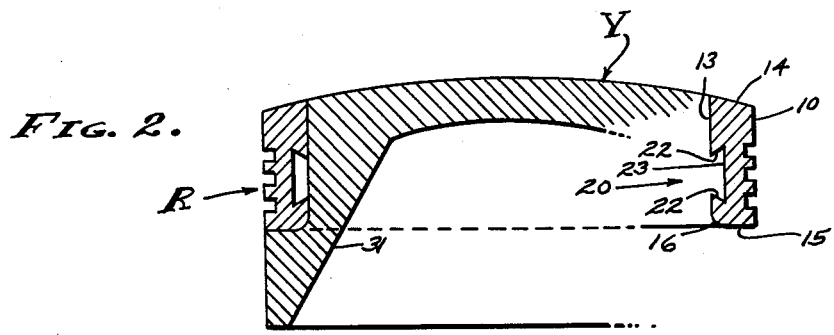
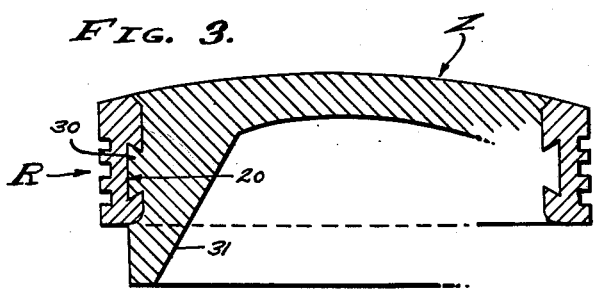
INVENTOR.
WALTER S. MAYES
BY
AGENT United States Patent Office 3,075,817
Patented Jan. 29, 1963

3,075,817
REINFORCED LIGHT WEIGHT PISTON
Walter S. Mayes, Los Alamitos, Calif., assignor to Harvey Aluminum (Incorporated), Torrance, Calif., a corporation of California
Filed Feb. 28, 1961, Ser. No. 92,273
14 Claims. (Cl. 309—14)

This invention relates to a piston for use in an internal combustion engine and the like and is particularly concerned with a piston of light material having reinforcing means of heavier material, it being a general object of this invention to advantageously utilize various forming processes and thereby produce a structure resulting in a most durable and highly efficient article of manufacture.

In the internal combustion art, there is the art of piston design and manufacture in order to supply, on a commercial basis, pistons in mass production for operation in the cylinders of engines. These are heat engines wherein fuels are combusted in the upper chambered end portions of the cylinders in order to drive the pistons inwardly after which the pistons are returned outwardly either to exhaust burned gases and/or to compress new charges of fuel or air or both. In any case, both two and four cycle internal combustion engines are familiar and need not be set forth in detail, said engines being generally and characteristically the same.

Light weight pistons are highly desirable, but they are subject to well known drawbacks. Mainly, it is the use of light weight materials that create the problems of structural weakness. The said structural weaknesses are many and varied, ranging from softness of material and strength generally, to problems due to thermal expansion and contraction. In order to obviate deficiencies in light weight pistons, for example in pistons made of aluminum, heavy reinforcement parts are employed, for example, parts of steel, and which are embedded in the piston structure. For instance, circular reinforcing rings are common and which are embedded in the main piston body. In actual practice, aluminum piston bodies are cast onto and surround steel reinforcing rings, and these rings can also be formed with grooves for the reception of the usual oil wiping and sealing rings. In any case, casting methods are old and not too satisfactory, since molten metal simply flows into place, usually without pressure, and when it cools it shrinks. The said shrinkage is notoriously an adverse feature and in the case of a piston structure of the type here under consideration said shrinkage results in inherent looseness of the parts.

An object of this invention is to provide a piston structure comprising a light weight body of aluminum or the like that is tightly secured to a heavy reinforcement of steel or the like.

Another object of this invention is to provide a reinforced piston structure that comprises a cast body of light weight material such as aluminum that is tightly secured to a heavy part of steel or the like. In the invention as illustrated, the said part is a turned part of steel with the cast body of aluminum entering a recess in said turned part.

It is an object of this invention to provide a piston of the character thus far referred to and which comprises partially, at least, compacted body portions engaged in or with the said reinforcement part.

It is another object of this invention to provide a piston of the character thus far referred to and which comprises partially, at least, wrought body portions to give the piston strength in order to prevent collapse.

It is still another object of this invention to provide a piston including all of the above mentioned objectives and which is practical to make and which utilizes the cast structure where it is advantageous, the compacted structure where it is advantageous, and the wrought structure where it is advantageous, all to the end that a single body has three distinct structural formations that are combined to great advantage.

The various objects and features of this invention will be fully understood from the following detailed description of the typical preferred forms and applications thereof, throughout which description reference is made to the accompanying drawings, in which:

FIG. 1 is a transverse sectional view through a piston embodying the present invention.

FIG. 2 is a sectional view similar to FIG. 1 and shows the body blank that is used in producing the structure of FIG. 1.

FIG. 3 is a view similar to FIG. 2 and shows a second form of body blank.

The piston is usual in form in that it comprises generally a head portion A, a ring portion B, and a skirt portion C. Also, there is a pair of wrist pin bearings D integral with the said portions A, B and C. In accordance with the invention, the piston is of the light weight type, being made mainly of a body X of light weight material such as aluminum or an alloy thereof. Further, the piston is also of the reinforced type, being strengthened by a ring band R.

In heat engines there are known to be advantages in having a piston with a cast head portion, and for this reason the piston of the present invention has a cast head portion A. However, instead of resorting to but one formation of the material forming the body X, the present invention contemplates a wrought skirt portion C which has known advantages, for instances in preventing collapse of the piston. Further, and as a result of retaining a cast head portion A and the formation of a wrought skirt porton C, there is an intermediate transition portion or ring portion B that is compacted. It is to be observed, therefore, that this invention is characterized by the three general areas, or portions A, B and C, integrally formed of a single body of material, but each having a distinct structural formation.

The body X is of one integral formation of material, preferably of aluminum alloyed to have suitable extruding or drawing properties. The method contemplated to be used in carrying out this invention is the method of extrusion, or of forging, it being a requirement that a portion of the body X is wrought. Therefore, the body X is made from a blank Y (or Z), as shown in FIG. 2 (FIG. 3), it being understood that the exact configuration of the blank can vary as circumstances require. That is, the engineering detail of the finished product will determine the exact nature of the blank, and only typical examples of such a blank are shown.

The ring band R is provided to reinforce the piston at the most active portion thereof and where the piston rings occur. The piston is, of course, a cylindrical structure with the piston rings carried in grooves at the outer diameter, there being three such grooves illustrated. In accordance with the preferred form of this invention the said ring grooves are formed in the ring band R, entering the outer diameter wall 10 of the band. Each groove has spaced and parallel side walls 11 and a bottom 12, and said grooves can be varied in order to receive any special type piston ring. The ring band R has an inner diameter wall 13 concentric with the wall 10 and it has top and bottom ends 14 and 15 in planes normal to the central axis. The said top end 14 can be contoured to flare into the shape of the head A, as shown. The said bottom end 15 is rounded at 16 to guide the flow of material when the skirt portion C is wrought.

In accordance with the invention, the ring band R is preferably a completed part prior to the formation of the body X. Therefore, said band R is machined and heat-treated, if desired, prior to the extrusion or forging of the said body X. As shown throughout the drawings, the ring band R is characterized by its recess 20 adapted to receive a key wrought from the blank Y (or Z). The said recess 20 can vary widely and as shown it is preferably an inwardly opening channel at the inner diameter wall 13. The said channel has spaced angularly disposed side walls 22 and a flat bottom 23, thereby forming an undercut configuration of dovetail form. The said channel is preferably a continuous annular recess that is readily machined as by turning.

The blanks Y and Z and blanks of various other forms, are preferably cast of the material to be wrought into the skirt portion C, it being understood that said blanks are cast when it is desired to have a cast head portion A. In other words, it is feasible to employ blanks formed by processes other than casting but this affects the ultimate formation of the head portion. In FIG. 1 of the drawings, the head portion A is indicated by 45° cross-hatching, indicating that said portion retains the condition and physical properties of the cast blank Y that is shown in FIG. 2. In FIG. 1 of the drawings the skirt portion C is indicated by 60° cross-hatching, indicating that said portion is wrought, longitudinally, and having the condition and physical properties of extruded or forged material, and distinct from the original blank material. In FIG. 1 of the drawings, the intermediate ring portion B is indicated by 30° cross-hatching, indicating that said portion is compacted and having the condition and physical properties of, for example, coined material, and distinct from the original blank material. Further, and as shown in FIG. 1 of the drawings, the said intermediate portion B has a key 30 that is indicated by 60° cross-hatching, indicating that said portion is wrought the same as said skirt portion C.

In order to form the blank Y into the body X having the portions A, B and C, usual dies are resorted to and employed in a press or the like to apply pressure to the blank Y in the presence of the ring band R. The said band R is seated in a die with the blank Y arranged as shown and the dies are closed in order to apply pressure to the inner wall 31 of said blank. The dies have the configuration of the inner and outer walls of the piston shown in FIG. 1, to the end that the portion B is pressured and the portion C is wrought to the shapes that are shown. Simultaneously, the wrist pin bearings D are wrought.

From the foregoing it will be seen that a blank Y as shown in FIG. 2 can be placed in dies and pressured so as to have a wrought skirt portion C without altering the condition of the head portion A. Further, there is an intermediate transition area between the skirt portion C and head portion A and referred to as the ring portion B. This said ring portion B is pressured in order that the underlying key 30 is wrought tightly into the recess 20, thereby securing the body X to the band R. Since the walls 22 are angularly related in a dovetail relationship there is a positive locking engagement of the parts X and R.

In FIG. 3 of the drawings the blank Z is illustrated and which involves a blank that is cast into the recess 20 of the ring band R. In this case, the key 30 is not wrought, but it is compacted, as by a coining pressure. Thus, the ring portion B is a dense and compact structure that is locked onto the ring band R.

The piston hereinabove described is of light weight character having a durable reinforced construction. The head portion A retains the condition and physical properties of the aluminum as originally cast in the blank form. The skirt portion C is wrought, longitudinally, to the condition and physical properties of an extrusion or forging. And, the ring portion B is pressured to the condition and physical properties of coined material, or the like. As a result, the body of light weight metal is locked onto the heavier reinforcement metal without looseness, and side wall strength is gained in the skirt portion C, all without losing the advantages of a cast head portion A or the like.

Having described only the typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A piston for operation in the cylinder of an engine and including, a cast head portion, an entirely wrought skirt portion depending from the said head portion, and a compacted portion intermediate the head portion and skirt portion.

2. A piston for operation in the cylinder of an engine and including, a head portion, an entirely wrought skirt portion depending from the said head portion, and a compacted portion intermediate the head portion and skirt portion, there being ring grooves at said compacted portion.

3. A piston for operation in the cylinder of an engine and including, a cast head portion, an entirely wrought skirt portion depending from the said head portion, and a compacted portion intermediate the head portion and skirt portion, there being ring grooves at said compacted portion.

4. A piston for operation in the cylinder of an engine and including, a body of one material formed onto a reinforcement of another material, said body comprising a cast head portion, and an entirely wrought skirt portion wrought onto said reinforcement.

5. A piston for operation in the cylinder of an engine and including, a body of one material formed onto a reinforcement of another material, said body comprising a head portion, an entirely wrought skirt portion, and a compacted portion intermediate the head portion and skirt portion and wrought onto said reinforcement.

6. A piston for operation in the cylinder of an engine and including, a body of one material formed onto a reinforcement of another material, said body comprising a cast head portion, an entirely wrought skirt portion, and a compacted portion intermediate the head portion and skirt portion and wrought onto said reinforcement.

7. A piston for operation in the cylinder of an engine and including, a body of one material and having a head portion and an entirely wrought depending skirt portion, a ring band surrounding the head portion, said skirt portion being wrought onto said ring band to depend therefrom.

8. A piston for operation in the cylinder of an engine and including, a body of one material and having a head portion and an entirely wrought depending skirt portion, a ring band surrounding the head portion and with a recess, said skirt portion being wrought onto said ring band and with a key wrought into said recess.

9. A piston for operation in the cylinder of an engine and including, a body of one material and having a head portion and a depending skirt portion and a ring portion intermediate the first two mentioned portions, a ring band surrounding the ring portion, said ring portion being compacted and said skirt portion being entirely wrought to depend therefrom.

10. A piston for operation in the cylinder of an engine and including, a body of one material and having a head portion and a depending skirt portion and a ring portion intermediate the first two mentioned portions, a ring band surrounding the ring portion and with a recess, said ring portion being compacted and with a key wrought into said recess and said skirt portion being entirely wrought to depend therefrom.

11. A piston for operation in the cylinder of an engine and including, a body of one material and having an entirely cast head portion and a depending entirely wrought skirt portion, a ring band surrounding the head portion, said skirt portion being wrought onto said ring band to depend therefrom.

12. A piston for operation in the cylinder of an engine and including, a body of one material and having an entirely cast head portion and a depending entirely wrought skirt portion, a ring band surrounding the head portion and with a recess, said skirt portion being wrought onto said ring band and with a key wrought into said recess.

13. A piston for operation in the cylinder of an engine and including, a body of one material and having an entirely cast head portion and a depending entirely wrought skirt portion and a ring portion intermediate the first two mentioned portions, a ring band surrounding the ring portion, said ring portion being compacted and said skirt portion being wrought to depend therefrom.

14. A piston for operation in the cylinder of an engine and including, a body of one material and having an entirely cast head portion and a depending entirely wrought skirt portion and a ring portion intermediate the first two mentioned portions, a ring band surrounding the ring portion and with a recess, said ring portion being compacted and with a key wrought into said recess and said skirt portion being wrought to depend therefrom.

References Cited in the file of this patent
UNITED STATES PATENTS

| | | |
|---|---|---|
| 1,848,083 | Wetherald | Mar. 1, 1932 |
| 1,854,271 | Michel | Apr. 19, 1932 |
| 2,050,993 | Bush | Aug. 11, 1936 |
| 2,124,360 | Welty | July 19, 1938 |
| 2,262,074 | Welty | Nov. 11, 1941 |
| 2,740,519 | Sparks | Apr. 3, 1956 |
| 2,756,876 | Watson | July 31, 1956 |
| 2,795,467 | Colwell | June 11, 1957 |